3,228,792
STAIN-RESISTANT AMINOPLAST
RESIN ARTICLE
Arthur S. Nyquist, Darien, Conn., assignor to American Cyanamid Company, Stamford, Conn., a corporation of Maine
No Drawing. Filed Aug. 1, 1962, Ser. No. 213,874
15 Claims. (Cl. 117—138.8)

This invention relates to a novel method of imparting resistance to stains, particularly those made by coffee and tea, to heat- and pressure-consolidated articles prepared from aminoplast resinous compositions. This invention also relates to the novel stain-resistant articles, such as molded tableware articles, produced according to my novel method, and further relates to the stain-retarding compositions used in preparing such articles.

The many excellent properties possessed by aminoplast resins, and in particular by aminotriazine-aldehyde resins such as melamine-formaldehyde resins, have led to their widespread use in the molding and laminating fields. More particularly, these thermo-setting or heat-hardenable resins possess, in the cured or thermoset state, superior break-resistance, resistance to water and other solvents, to softening or other internal heat failures, to cracking when exposed to electrical stress, and to surface failures such as loss of gloss, discoloration or crazing due to heat and light, all of which features render them especially suitable for the preparation of heat- and pressure-consolidated molded and laminated articles.

However, heat- and pressure-consolidated articles such as laminated table, counter and bar tops, molded cups, saucers, plates, and the like, prepared from conventional thermosetting aminoplast resins such as melamine-formaldehyde resinous condensates do possess one deficiency which detracts from their overall excellence. Articles of this type are susceptible to various kinds of stains. Coffee and tea are among the worst offenders in this respect, but other substances, for example, the juices of various fruits and vegetables, such as raspberry, grape, and beet juices, to mention just a few, soft drinks (e.g., cola drinks), cocoa, and the like, also leave stains which detract from the appearance, although not the durability, of such molded and laminated articles, and which in many cases are difficult to remove even if attended to immediately.

This propensity of conventionally prepared heat- and pressure-consolidated aminoplast resin-containing laminated and molded articles for staining has limited, in many cases, the extent to which such articles have found acceptance in many important areas of everyday use. For example many people, and especially restaurateurs and other large-volume users of dinnerware, have been reluctant to replace chinaware with high-quality tableware made from thermosetting melamine-formaldehyde resinous compositions, despite the latter's many obviously superior properties.

It have now discovered that thermosetting resinous compositions comprising a blend of a highly alkoxymethylated melamine, such as hexakis(methoxymethyl)melamine, with a free hydroxyl-containing copolymer obtained by polymerizing a vinyl aromatic monomer, e.g., styrene, with a hydroxy-containing vinyl monomer, e.g., allyl alcohol, when applied to the surfaces of heat- and pressure-consolidated cured or partially cured articles prepared from conventional thermosetting aminoplast resinous compositions, such as melamine-formaldehyde resinous compositions, and cured thereon to a substantially insoluble and infusible state by means of an acid curing catalyst, impart substantial stain-resistance to said articles.

It is, therefore, an object of my invention to provide a novel method of imparting stain-resistance to heat- and pressure-consolidated articles prepared from thermosetting aminoplast resinous compositions, particularly those prepared from melamine-formaldehyde resinous compositions.

It is also an object of my invention to prepare heat- and pressure-consolidated articles from theremosetting aminoplast resinous compositions, and particularly from melamine-formaldehyde resinous compositions, wherein the surfaces of said articles have been provided with a substantially insoluble and infusible cured, adherent coating which is resistant to staining by common foods and beverages.

A further object of my invention is to provide heat- and pressure-consolidated molded and laminated articles, prepared from thermosetting aminoplast resinous compositions such as melamine-formaldehyde resinous compositions, which have been coated with a substantially insoluble and infusible cured, adherent, stain-resistant coating comprising the resinous reaction product of a highly alkoxymethylated melamine having from about 3 to 6 methylol groups, of which from about 3 to 6 are alkylated with a lower alkyl group, and having not more than about one unalkylated methylol group, such as hexakis(methoxymethyl)melamine, and a free hydroxyl-containing copolymer obtained by polymerizing a vinyl aromatic monomer, e.g., styrene, with a hydroxyl-containing vinyl monomer, e.g., allyl alcohol.

A still further object of my invention is to provide stain-retardant compositions of matter useful in imparting stain-resistance to heat- and pressure-consolidated articles prepared from thermosetting aminoplast resinous compositions, particularly those prepared from melamine-formaldehyde resinous compositions.

These and other objects of my invention will be discussed more fully hereinbelow.

The thermosetting resinous compositions employed in the practice of the present invention, which may also be designated as potentially stain-retardant compositions, comprise, first of all, blends of two essential ingredients. The first of these is a highly alkoxymethylated melamine represented by the general formula:

$$MF_xA_y$$

wherein M represents melamine, the starting material, $F_x$ represents the degree to which the melamine starting material has been methylolated, with $x$ representing a number between about 3 and 6, inclusive, preferably a number between about 5 and 6, inclusive, and $A_y$ represents the degree to which the methylol groups of the polymethylolmelamine intermediate have been alkylated with lower alkyl groups containing from 1 to 4 carbon atoms, such as methyl, ethyl, propyl, n-butyl and the like, to provide alkoxymethyl groups containing from 2 to 5 carbon atoms in the highly alkoxymethylated melamine final product, with $y$ representing a number between about 3 and 6, inclusive, preferably a number between about 5 and 6, inclusive, such that there is no more than about one unalkylated methylol group present in the highly akoxymethylated melamine. Thus, the highly akoxymethylated melamines employed in the practice of the present invention range from the hexa-alkyl ethers of hexamethylolmelamine, such as hexakis(methoxymethyl)-melamine and the like, which represent the highest degree of methylolation and alkylation obtainable, to the trialkyl ethers of trimethylolmelamine, such as the trimethyl ether of trimethylolmelamine and the like. Furthermore, as is evident from the general formula and the values of x and y given above, one can use mixtures of these highly alkoxymethylated melamines, e.g., a mixture of hexakis(methoxymethyl) melamine and the pentamethyl ether of hexamethylolmelamine, and the like. In such cases x and y represent average values for the degree of methylolation and alkylation. Hexakis(methoxymethyl(melamine or mixtures containing a major amount thereof together with minor amounts of other highly methoxymethylated melamines having slightly lower degrees of methylolation and methylation are preferred for use in practicing the present invention.

The highly alkoxymethylated melamines are prepared by methods which are so well known in the art that it is not necessary that they be set forth in great detail herein. In general, these conventional methods involve the basic steps of reacting melamine with aqueous formaldehyde in mol ratios ranging from about 6.5 to about 20 mols or more of formaldehyde per mol of melamine to form polymethylolmelamines; removing the bulk of the water from the thus-formed polymethylolmelamines, and thereafter reacting the polymethylolmelamines under acidic conditions with from about 10 to about 30 mols of a lower alkanol, such as methanol, ethanol, propanol, and the like, per mol of melamine starting material. Various modifications and improvements of this basic process have been developed, such as those set forth in U.S. Patents Nos. 2,715,619 to Suen et al. and 2,918,452 to Kun et al.

The second essential ingredient of my potentially stain-retardant compositions is a free hydroxyl-containing copolymer containing from about 15% to about 85% by weight, and preferably from about 35% to about 60% by weight, based on the total weight of monomers in the copolymer, of a vinyl aromatic monomer, and from about 15% to about 85% by weight, and preferably from about 40% to about 65% by weight, based on the total weight of monomers in the copolymer, of a hydroxyl-containing vinyl monmer.

Among the vinyl aromatic monomers which can be employed in preparing the free hydroxyl-containing copolymer are styrene, side chain-substituted styrene, such as α-methyl styrene, α-ethyl styrene, and the like, ring substituted styrenes such as alkyl styrene, e.g., o-methyl styrene, m-ethyl styrene and p-propyl styrene, dialkyl styrenes, e.g., 2,4-dimethyl styrene and 2,5-diethyl styrene, halostyrenes, e.g., o-bromostyrene, p-chlorostyrene, 2,4-dichlorostyrene and 2,5-dibromostyrene, and vinyl naphthalene, e.g., β-vinyl naphthalene, and the like, as well as mixtures thereof. Styrene, due to its availability and low cost, is the preferred vinyl aromatic monomer.

A wide variety of hydroxyl-containing vinyl monomers may be employed in preparing the free hydroxyl-containing copolymer. However, an especially preferred class of hydroxyl-containing vinyl monomers encompasses those compounds represented by the general formula:

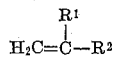

wherein $R^1$ represents a hydrogen atom, a halogen atom, i.e., fluorine, chlorine, bromine or iodine, an alkyl group having from 1 to 4 carbon atoms, inclusive, e.g., methyl, ethyl, n-propyl, n-butyl, and the like, or an aryl group, e.g., a phenyl group, and $R^2$ represents a hydroxyalkyl group, preferably a primary hydroxyalkyl group, having from 1 to 4 carbon atoms, inclusive, e.g., hydroxymethyl, 2-hydroxyethyl, 3-hydroxypropyl, 4-hydroxybutyl, and the like, or the radical

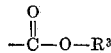

wherein $R^3$ represents a hydroxyalkyl group, preferably a primary hydroxyalkyl group, having not more than about 4 carbon atoms.

An illustrative but by no means exhaustive enumeration of hydroxyl-containing vinyl monomers coming within the scope of the general formula given above includes such compounds as allyl alcohol, β-bromoallyl alcohol, β-chloroallyl alcohol, methallyl alcohol, β-phenylallyl alcohol, 3-buten-1-ol, 3-buten-2-ol, 4-penten-1-ol, 4-penten-2-ol, β-hydroxyethyl acrylate, β-hydroxyethyl methacrylate, β-hydroxyethyl-2-ethylacrylate, β-hydroxyethyl-2-propylacrylate, β-hydroxyethyl-2-butylacrylate, β-hydroxyethyl-2-chloroacrylate, β-hydroxypropyl acrylate, γ-hydroxypropyl methacrylate, γ-hydroxypropyl-2-propylacrylate, γ-hydroxypropyl-2-butylacrylate, γ-hydroxypropyl-2-bromoacrylate, δ-hydroxybutyl acrylate, δ-hydroxybutyl methacrylate, γ-hydroxybutyl-2-ethylacrylate, γ-hydroxybutyl-2-butylacrylate, δ-hydroxybutyl - 2 - butylacrylate, δ-hydroxybutyl-2-chloroacrylate, and the like, as well as mixtures thereof. Of these monomers, allyl alcohol is preferred.

These hydroxyl-containing vinyl monomers, as well as methods for their preparation, are well known in the art. Thus, for example, one method for the preparation of the above-described hydroxyalkyl acrylates and alkacrylates involves reacting acrylic acid or the appropriate substituted acrylic acid, or a suitable ester thereof, with an alkane diol. Another method involves the reaction of acrylic acid or the appropriate substituted acrylic acid with a lower alkylene oxide, such as ethylene oxide, propylene oxide, and the like.

If desired, the free hydroxyl containing copolymer may also contain up to about 70% by weight, and preferably from about 15% to about 40% by weight, based on the total weight of monomers in the copolymer, of an alkyl ester of acrylic or methacrylic acid wherein the alkyl group has either a straight or a branched chain and contains up to about 12 carbon atoms. Included among these alkyl acrylates and methacrylates are such compounds as methyl acrylate, methyl methacrylate, ethyl acrylate, propyl methacrylate, n-butyl acrylate, 2-ethylhexyl methacrylate, octyl acrylate, dodecylmethacrylate, and the like, as well as mixtures thereof. It should be noted, however, that in every case no less than the minimum amounts of vinyl aromatic monomer and hydroxyl-containing vinyl monomer as set forth hereinabove will be employed, and also that the total amount of vinyl aromatic monomer, hydroxyl-containing vinyl monomer and, if used, alkyl acrylate or methacrylate will equal 100%.

The free hydroxyl-containing copolymers employed in practicing the present invention, as well as suitable methods of polymerizing the above-described monomers to provide these copolymers, are so well known in the art, as shown for example in U.S. Patents Nos. 2,630,430; 2,897,174; 2,940,946 and 2,961,424, each of which is incorporated herein by reference, that only the most cursory treatment of such methods is necessary here. In general, the selected comonomers are heated, preferably in a closed reaction vessel under autogenous pressure, at a temperature of from about 100° C. to about 250° C. for from about 15 minutes to about 10 hours. While the comonomers can be polymerized by themselves, they will preferably be reacted in the presence of a catalytic amount, e.g., from about 0.1% to about 5% or more by weight, based on the total weight of comonomers present, of a free radical polymerization catalyst, such as benzoyl peroxide, t-butyl peroxide, di-t-butyl peroxide, cumene hydroperoxide, t-butyl perbenzoate, and the like. The polymerization reaction can be carried out as either a batch or a continuous process, and once the reaction has been carried to the desired degree of completion, the reaction product can be worked up using any of several conventional methods, e.g., extraction, distillation, and the like, to recover the copolymer and remove any unreacted monomer and byproducts. The resulting copolymer, after being allowed to cool to room temperature, will usually be a hard, clear solid material, soluble in common organic solvents, such as the lower alkanols, i.e., methanol, ethanol, and the like, acetone, chloroform, benzene, toluene, xylene, and the like, and insoluble in water, mineral acids and polar organic solvents. The extent to which the copolymer is soluble in the aforementioned solvents will vary, depending on the relative proportions of vinyl aromatic compound and hydroxyl-containing vinyl compound contained therein. Thus, if the content of hydroxyl-containing vinyl compound is high the copolymer will be more readily soluble in the lower alkanols, while if the content of vinyl aromatic compound is high the copolymer will be more readily soluble in benzene, toluene, xylene, and the like.

These free hydroxyl-containing copolymers will vary in molecular weight depending on the reactants employed, the relative amounts thereof, and the extent to which the polymerization reaction is carried out, but in general their molecular weights will range from about 500 to about 8,000. As previously indicated, copolymers of styrene and allyl alcohol are preferred, and a particularly preferred species of styrene-allyl alcohol copolymer is the commercially available Polyol X-450 (Shell Chemical Corp.), a colorless, brittle solid which has a molecular weight of 1150, a hydroxyl equivalent/100 grams of 0.45, an average of 5.2 hydroxyl groups per molecule and an equivalent weight of 222.

The potentially stain-retardant compositions of the present invention are prepared by blending together from about 10% to about 60% by weight, preferably from about 20% to about 50% by weight, based on the total weight of highly alkoxymethylated melamine and free hydroxyl-containing copolymer, of the highly alkoxymethylated melamine and, correspondingly, from about 90% to about 40% by weight, preferably from about 80% to about 50% by weight, based on the total weight of highly alkoxymethylated melamine and free hydroxyl-containing copolymer, of said free hydroxyl-containing copolymer. Blending can be accomplished by milling a mixture of these two ingredients in the absence of a solvent on a mill, e.g., a two-roll rubber mill, at a temperature of from about 80° C. to about 130° C. until a substantially homogeneous blend is obtained, or by merely dissolving or dispersing either or both of these ingredients in a suitable inert organic solvent and then blending them together by any suitable mechanical means, such as in a laboratory mixer, to obtain a substantially homogeneous blend.

For certain applications dry blends, such as those obtained by milling mixtures of these two essential ingredients, will be pulverized to fine, powdery materials, for example by ball milling, and used as such. In other cases, these powdered materials will be dissolved in a suitable organic solvent and used in this form to treat the surfaces of heat- and pressure-consolidated aminoplast articles. Similarly, blends prepared from solutions of the two ingredients may be either used as such for certain applications, with or without the further addition of organic solvent, or the solvent used in preparing the blend may be evaporated and the resulting dry, homogeneous blend may then be pulverized to a fine powder and used in this form as a potentially stain-retardant composition.

As previously indicated, an acid curing catalyst will be incorporated into my potentially stain-retardant compositions prior to their use in order to facilitate their cure. A particularly preferred class of acid curing catalysts includes mineral acids, such as phosphoric acid and the like, organic acids such as phthalic, p-toluenesulfonic, benzenesulfonic, and the like, acid salts, e.g., the morpholine and N-methyl morpholine salts of p-toluenesulfonic and benzenesulfonic acids, and mixtures thereof, e.g., a mixture containing from about 30% to about 70% of p-toluenesulfonic acid and, correspondingly from about 70% to about 30% of the N-methyl morpholine salt of p-toluenesulfonic acid. The optimum curing conditions are modified to some extent by the choice of the particular catalyst. Thus, a more active catalyst, e.g., p-toluenesulfonic acid, should be used in lower concentrations than a less reactive material, e.g., phthalic acid or the aforementioned blends of p-toluenesulfonic acid and its N-methyl morpholine salt, such as 65/35 salt/acid blend. In general, however, these acid curing catalysts may be employed in amounts ranging from about 0.2% to about 2% by weight, based on the total weight of the resinous blend, which blend may be in either solution or powder form at the time the acid curing catalyst is introduced.

It should also be noted at this point that the procedures outlined above for the preparation of my potentially stain-retardant compositions merely represent preferred methods of preparation, and should not be considered a limitation on my inventive concept, inasmuch as any suitable method of compounding the essential ingredients of my compositions may be employed without detracting from the spirit and scope of the invention.

Similarly, any of a number of suitable methods may be employed in applying my potentially stain-retardant compositions to the surfaces being treated and curing said compositions thereon.

One such method involves the use of solutions of the potentially stain-retardant compositions in inert organic solvents. Among such solvents there are included aromatic hydrocarbons, such as benzene, toluene, xylene, and the like; aliphatic monocarboxylic acid esters of aliphatic monohydric alcohols, such as butyl acetate, amyl acetate, hexyl acetate, ethyl butyrate, and the like; aliphatic monocarboxylic acid monoesters of the lower alkyl monoethers of dihydric alcohols, such as the monoacetates of the methyl, ethyl, propyl and butyl monoethers of ethylene glycol, diethylene glycol, and the like; aliphatic monocarboxylic acid diesters of dihydric alcohols, such as the diacetates of ethylene glycol, diethylene glycol, and the like; ketones, such as acetone, methyl ethyl ketone, diethyl ketone, methyl isobutyl ketone, cyclohexanone, and the like; halogenated organic solvents, such as ethylene dichloride, chlorobenzene, and the like, and nitroparaffins, such as nitropropane and the like. As might be expected, mixtures of these solvents may also be employed and, in some instances, will even be preferred.

The relative amounts of the solvent and the substantially homogeneous blend of a highly alkoxy-methylated melamine and a free hydroxyl-containing copolymer which are employed may be varied over a wide range, depending on the viscosity desired in the coating composition, which in turn will depend on the method to be employed in applying the composition to the surfaces to be treated. For instance, if the composition is to be applied using a doctor knife or similar spreading means, relatively viscous solutions or, in some cases, almost paste-like materials, will be prepared. In such a case, relatively small amounts of solvent are needed. If, on the other hand, the composition is to be applied by spraying, by brush- or roller-coating, or by dipping the article therein, larger amounts of solvent will be employed. In general, the amount of solvent employed will be such that the substantially homogeneous blend will be present in solution at a solids content ranging from about 5% to about 95% by weight.

Where solutions of my potentially stain-retardant compositions in inert organic solvents are formulated for use in dip-, flow-, brush- or roller-coating heat- and pressure-consolidated aminoplast articles it may be desirable, in certain instances, to add to such solutions minor amounts, e.g., amounts ranging from about 0.1 to about 1 part by weight, based on the total weight of the solution, of conventional levelling agents, such as butylated melamine-formaldehyde resins, butylated urea-formaldehyde resins, silicone oils, and the like, in order to counteract any possible tendency towards cratering or pinholing in the final thermoset coating. Ordinarily, this expedient will not be necessary where solutions of my potentially stain-retardant compositions are applied using conventional spray-coating techniques.

If the substantially homogeneous blends are to be used to provide clear stain-resistant coatings, no colorant need be used. However, if it is desired to produce colored coatings a wide variety of pigments, dyes and colorants of all descriptions may be incorporated in conventional amounts into said blends to provide the desired effect.

Following the application of the solution of my potentially strain-retardant composition to the aminoplast surface being treated, the coated article is first let stand for a period of time sufficient to evaporate all or at least part of the inert solvent and also to allow the coating to level out, e.g., the coated cup can be subjected to air drying at room temperature, and is then placed in an oven and heat-treated, at temperatures ranging from about 110° C. to about 165° C. for from about 5 to about 40 minutes, to cure the thermosetting coating to a substantially insoluble, infusible, stain-resistant form. The drying time prior to heat-treating may be accelerated if desired, for example by the use of a suitable drying apparatus or by applying the coating composition to the heat- and pressure-consolidated aminoplast article as it comes from the mold or press.

Another method which is particularly adapted to the preparation of aminoplast molded articles coated with the stain-resistant compositions of the present invention involves a technique which may be termed overglaze molding and which may be best understood by first briefly considering the procedure customarily followed in the conventional methods of preparing heat- and pressure-consolidated molded articles from aminoplast resinous compositions such as thermosetting melamine-formaldehyde resinous compositions.

The termosetting aminoplast resinous molding materials employed in the usual commercial molding practices are prepared by first impregnating a fibrous filler, such as chopped α-cellulose, with a thermosetting aminoplast resin in syrup form, drying the impregnated material to a low volatile content, usually in the order of about 10% or less, converting the dried material to a fine, fluffy powder while blending it with various commonly employed additives, such as curing catalysts, pigments, mold lubricants, and the like, and finally densifying and granulating the powdered molding composition, thus converting it to a form especially suited for commercial molding techniques.

In such techniques, the common practice is to first shape the granular molding composition into a pre-formed article which approximates the shape the article will assume in its final form. This pre-forming step may be carried out either in a press or mold specifically designed for pre-forming or in a conventional molding press, either with or without the application of heat, to result in a pre-formed article whose resin content either remains uncured or becomes only partially cured, thus providing for the subsequent application of a decorative overlay, if desired. Decorative overlays comprising a single sheet or foil of high grade α-cellulose paper or similar fibrous material impregnated with a thermosetting aminoplast resin of the type found in the pre-form and imprinted with an ornamental design are usually employed to provide a decorative effect to relatively flat molded pieces, such as dinner plates, saucers, and the like, and ordinarily not used with deep-draw molded articles such as cups, bowls, and the like. The pre-formed article is of a somewhat porous nature, and should contain slightly more resinous material than will be retained by the article when it assumes its final molded form. This is to insure that the mold used in the final molding operation will be substantially filled, with the usual provision being made for a small amount of flashing.

Ordinarily, the pre-formed article, either with or without a decorative overlay, is then placed in a molding press and molded, under suitable conditions of heat and pressure, to its final molded form. The overglaze molding technique employed in preparing aminoplast molded articles coated with the stain-resistant compositions of the present invention represents a slight departure from this common practice, in that the pre-formed article is first molded under suitable conditions of heat and pressure until the point is reached at which, for the first time, the degree of cure accomplished is such that the mold can be opened without damaging the article being molded or having it stick to the opening portion of the mold. An article which has reached this degree of cure can be termed a pre-molded article. The time required to reach this point in the curing cycle will depend on many factors, e.g., the design of the mold, the nature of the composition being molded, the temperatures and pressures used, etc., and will vary to some extent for each different molding operation encountered, but in general, it will usually be about 30 seconds or more after the start of the molding cycle. At this point, the mold is opened and an amount of my potentially stain-retardant composition, either in powdered form or as a solution in an inert solvent, sufficient to ultimately produce a thermoset coating of a desired thickness on the surfaces being treated is placed on the pre-molded article. Then, the mold is again closed, heat and pressure are applied, and the curing of both the pre-molded article and the potentially stain-retardant composition is carried to substantial completion.

Coatings of the stain-resistant compositions of the present invention may be applied to heat- and pressure-consolidated aminoplast resin articles in a wide range of thicknesses. The thickness of a particular coating applied by any suitable method, including those described hereinabove, can be regulated by many factors, including those inherent in the particular coating process itself, e.g., the viscosity of the treating solution and the time of contact in the case of coatings applied from solution. Stain-resistance can be obtained from coatings or films of a fraction of a mil in thickness. However, depending on the degree of abrasion resistance required in the coated article, coatings or films of from about 0.2 to about 1 mil or higher will usually be applied.

Thermosetting aminoplast resins of the type employed in the preparation of the heat- and pressure-consolidated articles treated in accordance with the practice of the present invention are synthetic resins prepared by the condensation reaction of an amino (including imino) or amido (including imido) compound with an aldehyde. Resinous condensates of this type, as well as methods for their preparation, have been shown innumerable times in the prior art, and adequate disclosures of them may be found in, for example, U.S. Patents Nos. 2,197,357; 2,310,004 and 2,328,592 to Widmer et al. and 2,260,239 to Talbot. The present invention is concerned particularly with the treatment of molded and laminated articles prepared from aminoplast resins of the type wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are used to prepare molded and laminated articles treated according to the practice of the present invention, but other aminotriazines, e.g., mono-, di- and tri-substituted melamines, such as the mono, diand trimethylmelamines, and the like; guanamines, such as formoguanamine, acetoguanamine, benzoguanamine, and the like, as well as mixtures of aminotriazines, may be utilized as reactants. Similarly, formaldehyde, preferably in aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in such resinous reaction products is not critical, and may be within the order of from about 1.5:1 to about 4:1, respectively, depending on the nature of the starting materials and the characteristics desired in the final product, but it is preferred that the mol ratio be within the order of from about 2:1 to about 3:1, respectively.

Conventional reaction conditions are observed in preparing the thermosetting aminotriazine-aldehyde resin, i.e., the aldehyde and aminotriazine may be heat-reacted at temperatures ranging from about 40° C. to reflux temperature, i.e., about 100° C., for periods of time ranging from about 30 to 120 minutes, at a pH ranging from about 6.5 to 10, preferably in an aqueous medium. Any substance yielding acidic or alkaline aqueous solutions may be used to regulate the pH, for example, alkaline materials such as alkali metal or alkaline earth metal oxides, hydroxides or salts with weak acids, e.g., sodium, potassium or calcium hydroxide or sodium or potassium carbonate; mono- di- or trialkylamines, e.g., ethanolamine, triethylamine or triethanolamine; alkylene polyamines or polyalkylene polyamines, e.g., 3,3′-iminobispropylamine, and the like, or acidic materials such as hydrochloric acid, sulfuric acid, phosphoric acid, acetic acid, or salts thereof, and the like.

I may also employ other amido or imido compounds having at least two aldehyde-reactable hydrogen atoms attached to amidogen nitrogen atoms besides the aminotriazines in preparing the aminoplast resins used in the heat- and pressure-consolidated articles treated in accordance with the present invention. For example, I may employ urea and those of its derivatives which have been commonly used in the preparation of aminoplast resinous compositions, such as for example the alkylureas, e.g., mono- and dimethylurea, halourea, and the like.

The properties of these thermosetting aminoplast resins can be further modified, if desired, by incorporating various other substances into the thermosetting aminotriazine-aldehyde resin. Included among such substances are plasticizers such as the α-alkyl-D-glucosides, e.g., α-methyl-D-glucoside, disclosed in U.S. Patent No. 2,773,848 to Lindenfelser, methylol derivatives corresponding to the general formula:

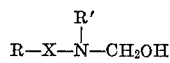

wherein R represents an alkyl, aryl or aralkyl group, R′ represents a hydrogen atom or an alkyl, alkylol, aryl or acyl group, and X represents

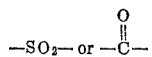

e.g., N-methylol p-toluenesulfonamide (which may be formed in situ by the addition of p-toluenesulfonamide to an amidogen-formaldehyde reaction mixture) and the like, or combinations of these glucosides and methylol derivatives, e.g., a mixture of α-methyl-D-glucoside and p-toluenesulfonamide, as disclosed in U.S. Patent No. 2,773,788 to Magrane et al.

The various processes for the preparation of heat- and pressure-consolidated molded and laminated articles from aminoplast resinous compositions are so well known in the art that no further mention need be made of them here, except to say that aminoplast resinous compositions may be used with any conventional material, e.g., α-cellulose paper, cellulosic fabrics, silk, glass cloth, rayon, nylon, or other synthetic fabrics, and the like, in the preparation of laminates and also that aminoplast resinous compositions may have incorporated therewith for molding purposes conventional fillers, such as α-cellulose, cellulosic fibers, glass or other synthetic fibers, asbestos, mica, sand, ground cork and the like, mold lubricants, such as zinc stearate, glyceryl monostearate, and the like, curing catalysts, such as phthalic anhydride, p-toluenesulfonic acid, benezenesulfonic acid, and the like.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

*Example 1*

250 parts of hexakis(methoxymethyl)melamine and 250 parts of Polyol X-450, a commercially available styrene-allyl alcohol copolymer, were charged to a mechanical mixer together with 220 parts of methyl isobutyl ketone, 80 parts of methyl ethyl ketone, 75 parts of toluene and 75 parts of xylene. This mixture was blended at room temperature for 90 minutes and then filtered. The resulting substantially homogeneous blend was then admixed with 1% based on resin solids, of p-toluenesulfonic acid until the acid was thoroughly dispersed throughout the blend, giving a potentially stain-retardant composition having a viscosity of 25 centipoises at 25° C.

Three hundred parts of the above-described potentially stain-retardant composition were charged to the pressure pot of a De Vilbiss spray gun. A pot pressure of 2 p.s.i. (gauge) of clean, filtered air was applied, and an atomizing pressure of 20 p.s.i. (gauge) of clean, filtered air was applied to the spray gun. Next, a clean, dust-free white coffee cup, molded from a commercially available α-cellulose-filled thermosetting melamine-formaldehyde resin molding composition (mol ratio formaldehyde:melamine equals 2:1, respectively), was placed on a rotating turntable which, by means of two timers in series, was then brought to a speed of 300 revolutions per minute. At this point the spray gun was actuated by an air-operated solenoid valve for 0.3 second. Following this spray time the cup, coated inside and out with the potentially stain-retardant composition, was removed from the turntable and the coating was allowed to level for 1 minute. Finally, the coated cup was baked in a circulating air oven for 30 minutes at 132° C., removed from the oven, and allowed to cool to room temperature. It had a clear, glossy appearance and was found to be highly resistant to coffee-staining when subjected to the following accelerated test.

A strong brew of black coffee was prepared by dissolving 32 grams of a commercially available instant coffee in 1 liter of boiling water. The coffee solution was then cooled to 80° C. and the cup was immersed therein for a period of 144 hours, with the temperature of the coffee solution being held at 80° C. during that time. At the end of the immersion period, the cup was removed from the coffee solution, washed with soap and water and dried. The cup remained white and unstained, whereas an identical but uncoated melamine-formaldehyde molded cup tested in the same manner was badly stained and dark brown in appearance.

In adidtion to its coffee-stain resistance, the coated cup was also unaffected by immersion for 24 hours in a 5.25% solution of sodium hypochlorite maintained at a temperature of 60° C.–70° C.

Examples II–IV

The procedure employed in Example I was repeated in every detail with one exception, namely, the weight ratios of hexakis(methoxymethyl)melamine to Polyol X–450 styrene-allyl alcohol copolymer were 10:90, 25:75 and 60:40, respectively, rather than 50:50. In each case, the resulting coating was clear and glossy, and was highly resistant to coffee staining when subjected to the accelerated coffee-staining test described above.

Example V

The procedure of Example I was again repeated in every detail except the following. 250 parts of a mixture of hexakis(methoxymethyl)melamine with minor amounts of other highly methoxymethylated melamines such that the mixture analyzed as $MF_{5.7}Me_{5.5}$ were used as the highly alkoxymethylated melamine reactant, and an amount of a mixture of 50% of the N-methyl morpholine salt of p-toluenesulfonic acid and 50% of free p-toluenesulfonic acid sufficient to give 1% of p-toluenesulfonic acid, based on resin solids, in the blend was employed as the catalyst. The coated surface of a clean, dust-free, white molded melamine-formaldehyde coffee cup treated in the manner described in Example I was clear and glossy, and exhibited no coffee stains after being subjected to the accelerated coffee-staining test.

Example VI

Twenty-five parts of the mixture of highly alkoxymethylated melamines employed in Example V ($MF_{5.7}Me_{5.5}$), 75 parts of Polyol X–450 styrene-allyl alcohol copolymer, 73.2 parts of methyl isobutyl ketone, 24.4 parts of toluene and 24.4 parts of xylene were charged to a mechanical mixer and blended at room temperature until a substantially homogeneous blend was obtained. Then, 1.5% of phthalic acid, based on resin solids, was added to the blend and thoroughly dispersed therein.

The catalyzed blend was flow-coated on the surfaces of a clean, dust-free, white molded melamine-formaldehyde coffee cup, and the excess solution allowed to drain off. Next, the coated cup was air-dried at room temperature for 20 minutes and then baked in a circulating air oven for 10 minutes at 150° C. The resulting coated cup had a clear, glossy thermoset surface coating which exhibited no coffee stains after being subjected to the accelerated coffee-staining test.

Example VII

The procedure described in Example VI was repeated using 60 parts of hexakis(methoxymethyl)melamine, 40 parts of Polyol X–450 styrene-allyl alcohol copolymer, 37 parts of methyl isobutyl ketone, 12.3 parts of toluene and 12.3 parts of xylene blended together as the coating solution, and 0.75%, based on resin solids, of p-toluenesulfonic acid as the catalyst. The resulting coated coffee cup had a clear, glossy surface which was highly resistant to coffee-staining when subjected to the accelerated test.

Example VIII

Seventy parts of a copolymer obtained by the emulsion polymerization of 85 parts of styrene and 15 parts of β-hydroxyethyl methacrylate and 30 parts of hexakis(methoxymethyl)melamine were charged to a mechanical mixer together with 300 parts of a solvent blend consisting essentially of 60% Cellosolve acetate and 40% methyl ethyl ketone and blended until a substantially homogeneous blend was obtained. This blend was then catalyzed by substantially uniformly dispersing therein 1% of p-toluenesulfonic acid, based on resin solids.

A clean, dust-free, white molded melamine-formaldehyde coffee cup was dip-coated with the potentially stain-retardant composition, allowed to air-dry for 15 minutes at room temperature, and then baked in a circulating air oven for 35 minutes at 135° C. The clear, glossy, thermoset coating on the cup exhibited no coffee stains after being subjected to the accelerated coffee-staining test.

Example IX

The procedure employed in Example VIII was repeated in every detail with one exception. In 5 successive runs, the copolymer of styrene and β-hydroxyethyl methacrylate was replaced by copolymers prepared by the emulsion polymerization of 85% of styrene and 15% of 3-buten-1-ol, 80% of styrene and 20% of β-hydroxyethyl acrylate, 60% of styrene and 40% of β-hydroxyethyl-2-ethylacrylate, 45% of α-methyl styrene with 40% of methyl methacrylate and 15% of allyl alcohol, and 85% of p-propyl styrene and 15% of methallyl alcohol, respectively. In all cases the resulting coated coffee cups were highly stain-resistant when subjected to the accelerated coffee-staining test.

Example X

Fifty parts of hexakis(methoxymethyl)melamine, 50 parts of Polyol X–450 styrene-allyl alcohol copolymer and 18 parts of methyl ethyl ketone were charged to a mechanical mixer and blended together until a substantially homogeneous blend was obtained. Next, 0.75% of phthalic acid, based on resin solids, was thoroughly dispersed throughout the blend, which was then ready for use as a potentially stain-retardant composition.

The required amount of a commercially available α-cellulose-filled melamine-formaldehyde molding composition (mol ratio formaldehyde:melamine=2:1, respectively) was charged to the cavity of a standard coffee cup mold. The mold was closed and the charge was partially cured by molding at a temperature of 165° C. under a pressure of 3,000 p.s.i. for 50 seconds. The mold was then opened and 3 grams of the potentially stain-retardant composition were charged to the interior of the pre-molded cup. The mold was again closed and the overglazed cup was cured at a temperature of 165° C. under a pressure of 3,000 p.s.i. for an additional 50 seconds, following which the cured cup was removed from the mold and allowed to cool to room temperature. The thermoset coating on the inner surface of the cup was clear and glossy, and was highly resistant to coffee-staining when subjected to the accelerated test. In contrast to this, the uncoated outer surface of the cup became badly stained after immersion in the coffee solution for 144 hours at 80° C.

Example XI

Fifty parts of hexakis(methoxymethyl)melamine and 50 parts of Polyol X–450 styrene-allyl alcohol copolymer were blended together on a two-roll mill at a temperature of about 135° C. until a substantially homogeneous blend was obtained. The blend was allowed to cool to room temperature and was then passed through a granulating mill. The resulting coarse ground resin, together with 0.5%, based on the weight of the resin, of p-toluenesulfonic acid, was then ball milled until a fine, dry, catalyzed powder was obtained.

A charge of 2.5 grams of this powder was applied to the inner surface of a pre-molded melamine-formaldehyde coffee cup in the same manner as the overglazing composition of Example X. The thermoset coating on the inner surface of the resulting cured cup was clear and glossy, and was highly resistant to coffee-staining when subjected to the accelerated test.

It will be obvious to those skilled in the art that other changes and variations can be made in carrying out the present invention without departing from the spirit and scope thereof as defined in the appended claims.

I claim:

1. A heat- and pressure-consolidated substantially completely cured article, prepared from a thermosetting aminoplast resinous composition, coated with a substantially insoluble and infusible cured, adherent, stain-resistant composition consisting essentially of the resinous reaction product of:
  (A) from about 10% to about 60% by weight of a highly methoxymethylated melamine having from about 5 to 6 methylol groups, of which from about 5 to 6 are alkylated with a methyl group, and having not more than about one unmethylated methylol group, and correspondingly
  (B) from about 90% to about 40% by weight of a free hydroxyl-containing copolymer obtained by polymerizing (1) from about 15% to about 85% by weight of a mono vinyl aromatic monomer with (2) from about 15% to about 85% by weight of a hydroxyl-containing vinyl monomer represented by the general formula:

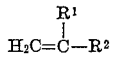

wherein $R^1$ represents a member selected from the group consisting of a hydrogen atom, a halogen atom, an alkyl group having from 1 to 4 carbon atoms, inclusive, and an aryl group, and $R^2$ is a member selected from the group consisting of a hydroxyalkyl group having from 1 to 4 carbon atoms, inclusive, and the radical

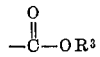

wherein $R^3$ represents a hydroxyalkyl group having not more than about 4 carbon atoms, and (3) from 0% to about 70% by weight of a comonomer selected from the group consisting of alkyl esters of acrylic and methacrylic acid wherein the alkyl group contains up to about 12 carbon atoms, the weights of said (1), (2) and (3) each being based on the total weight of monomers in said copolymer,
the weights of said (A) and (B) each being based on the total weight of said (A) and (B).

2. An article as described in claim 1 wherein the aminoplast resinous composition is an aminotriazine-aldehyde resinous composition.

3. An article as described in claim 1 wherein the aminoplast resinous composition is a melamine-formaldehyde resinous composition.

4. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:
  (A) from about 10% to about 60% by weight of a highly methoxymethylated melamine having from about 5 to 6 methylol groups, of which from about 5 to 6 are alkylated with a methyl group, and having not more than about one unmethylated methylol group, and correspondingly
  (B) from about 90% to about 40% by weight of a free hydroxyl-containing copolymer obtained by polymerizing (1) from about 15% to about 85% by weight of styrene with (2) from about 15% to about 85% by weight of allyl alcohol and (3) from 0% to about 70% by weight of an alkyl ester of methacrylic acid wherein the alkyl group contains up to about 12 carbon atoms, the weights of said (1), (2) and (3) each being based on the total weight of monomers in said copolymer,
the weights of said (A) and (B) each being based on the total weight of said (A) and (B).

5. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:
  (A) from about 10% to about 60% by weight of a highly methoxymethylated melamine having from about 5 to 6 methylol groups, of which from about 5 to 6 are alkylated with a methyl group, and having not more than about one unmethylated methylol group, and correspondingly
  (B) from about 90% to about 40% by weight of a free hydroxyl-containing copolymer obtained by polymerizing (1) from about 15% to about 85% by weight of styrene with (2) from about 15% to about 85% by weight of β-hydroxyethyl methacrylate and (3) from 0% to about 70% by weight of an alkyl ester of methacrylic acid wherein the alkyl group contains up to about 12 carbon atoms, the weights of said (1), (2) and (3) each being based on the total weight of monomers in said copolymer,
the weights of said (A) and (B) each being based on the total weight of said (A) and (B).

6. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:
  (A) from about 10% to about 60% by weight of a highly methoxymethylated melamine having from about 5 to 6 methylol groups, of which from about 5 to 6 are alkylated with a methyl group, and having not more than about one unmethylated methylol group, and correspondingly
  (B) from about 90% to about 40% by weight of a free hydroxyl-containing copolymer obtained by polymerizing (1) from about 15% to about 85% by weight of styrene with (2) from about 15% to about 85% by weight of allyl alcohol and (3) from 0% to about 70% by weight of methyl methacrylate, the weights of said (1), (2) and (3) each being based on the total weight of monomers in said copolymer,
the weights of said (A) and (B) each being based on the weight of said (A) and (B).

7. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:
  (A) from about 10% to about 60% by weight of a highly methoxymethylated melamine having from about 5 to 6 methylol groups, of which from about 5 to 6 are alkylated with a methyl group, and having not more than about one unmethylated methylol group, and correspondingly
  (B) from about 90% to about 40% by weight of a free hydroxyl-containing copolymer obtained by polymerizing (1) from about 15% to about 85% by weight of styrene with (2) from about 15% to about 85% by weight of β-hydroxyethyl methacrylate and (3) from 0% to about 70% by weight of methyl methacrylate, the weights of said (1), (2) and (3) each being based on the total weight of monomers in said copolymer,
the weights of said (A) and (B) each being based on the total weight of said (A) and (B).

8. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:
  (A) from about 20% to about 50% by weight of a highly methoxymethylated melamine having from about 5 to 6 methylol groups, of which from about 5 to 6 are alkylated with a methyl group, and having not more than about one unmethylated methylol group, and correspondingly (B) from about 80% to about 50% by weight of a free hydroxyl-containing copolymer obtained by polymerizing (1) from about 35% to about 60% by weight of styrene with (2) from about 40% to about 65% by weight of allyl alcohol and (3) from 0% to about 25% by weight of an alkyl ester of methacrylic acid wherein the alkyl group contains up to about 12 carbon atoms, the weights of said (1), (2) and (3) each being based on the total weight of monomers in said copolymer, the weights of said (A) and (B) each being based on the total weight of said (A) and (B).

9. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:

(A) from about 20% to about 50% by weight of a highly methoxymethylated melamine having from about 5 to 6 methylol groups, of which from about 5 to 6 are alkylated with a methyl group, and having not more than about one unmethylated methylol group, and correspondingly (B) from about 80% to about 50% by weight of a free hydroxyl-containing copolymer obtained by polymerizing (1) from about 35% to about 60% by weight of styrene with (2) from about 40% to about 65% by weight of β-hydroxyethyl methacrylate and (3) from 0% to about 25% by weight of an alkyl ester of methacrylic acid wherein the alkyl group contains up to about 12 carbon atoms, the weights of said (1), (2) and (3) each being based on the total weight of monomers in said copolymer, the weights of said (A) and (B) each being based on the total weight of said (A) and (B).

10. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:

(A) from about 20% to about 50% by weight of a highly methoxymethylated melamine having from about 5 to 6 methylol groups, of which from about 5 to 6 are alkylated with a methyl group, and having not more than about one unmethylated methylol group, and correspondingly (B) from about 80% to about 50% by weight of a free hydroxyl-containing copolymer obtained by polymerizing (1) from about 35% to about 60% by weight of styrene with (2) from about 40% to about 65% by weight of allyl alcohol and (3) from 0% to about 25% by weight of methyl methacrylate, the weights of said (1), (2) and (3) each being based on the total weight of monomers in said copolymer, the weights of said (A) and (B) each being based on the total weight of said (A) and (B).

11. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:

(A) from about 20% to about 50% by weight of a highly methoxymethylated melamine having from about 5 to 6 methylol groups, of which from about 5 to 6 are alkylated with a methyl group, and having not more than about one unmethylated methylol group, and correspondingly (B) from about 80% to about 50% by weight of a free hydroxyl-containing copolymer obtained by polymerizing (1) from about 35% to about 60% by weight of styrene with (2) from about 40% to about 65% by weight of β-hydroxyethyl methacrylate and (3) from 0% to about 25% by weight of methyl methacrylate, the weights of said (1), (2) and (3) each being based on the total weight of monomers in said copolymer, the weights of said (A) and (B) each being based on the total weight of said (A) and (B).

12. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:

(A) from about 20% to about 50% by weight of a highly methoxymethylated melamine having from about 5 to 6 metyhlol groups, of which from about 5 to 6 are alkylated with a methyl group, and having not more than about one unmethylated methylol group, and correspondingly (B) from about 80% to about 50% by weight of a free hydroxyl-containing copolymer obtained by polymerizing (1) from about 35% to about 60% by weight of styrene with (2) from about 40% to about 65% by weight of allyl alcohol, the weights of said (1) and (2) each being based on the total weight of monomers in said copolymer, the weights of said (A) and (B) each being based on the total weight of said (A) and (B).

13. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:

(A) from about 20% to about 50% by weight of a highly methoxymethylated melamine having from about 5 to 6 methylol groups, of which from about 5 to 6 are alkylated with a methyl group, and having not more than about one unmethylated methylol group, and correspondingly (B) from about 80% to about 50% by weight of a free hydroxyl-containing copolymer obtained by polymerizing (1) from about 35% to about 60% by weight of styrene with (2) from about 40% to about 65% by weight of β-hydroxyethyl methacrylate, the weights of said (1) and (2) each being based on the total weight of monomers in said copolymer, the weights of said (A) and (B) each being based on the total weight of said (A) and (B).

14. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:

(A) from about 20% to about 50% by weight of hexakis(methoxymethyl)melamine and correspondingly (B) from about 80% to about 50% by weight of a free hydroxyl-containing copolymer obtained by polymerizing (1) from about 35% to about 60% by weight of styrene with (2) from about 40% to about 65% by weight of β-hydroxyethyl methacrylate, the (1) and (2) each being based on the total weight of monomers in said copolymer, the weights of said (A) and (B) each being based on the total weight of said (A) and (B).

15. A heat- and pressure-consolidated substantially completely cured article, prepared from a thermosetting melamine-formaldehyde resinous composition, coated with a substantially insoluble and infusible cured, adherent, stain-resistant composition consisting essentially of the resinous reaction product of:

(A) from about 20% to about 50% by weight of hexakis(methoxymethyl)melamine and correspondingly (B) from about 80% to about 50% by weight of a free hydroxyl-containing copolymer obtained by polymerizing (1) from about 35% to about 60% by weight of styrene with (2) from about 40% to about 65% by weight of β-hydroxyethyl methacrylate, the weights of said (1) and (2) each being based on the total weight of monomers in said copolymer, the weights of said (A) and (B) each being based on the total weight of said (A) and (B).

References Cited by the Examiner

UNITED STATES PATENTS

| | | | |
|---|---|---|---|
| 2,897,174 | 7/1959 | Chapin et al. | 260—33.4 X |
| 2,918,452 | 12/1959 | Kun et al. | 260—67.6 |
| 3,096,208 | 7/1963 | Nyquist et al. | 117—138.8 |
| 3,131,086 | 4/1964 | Nyquist et al. | 117—138.8 |

WILLIAM D. MARTIN, *Primary Examiner.*

JOSEPH REBOLD, *Examiner.*

A. R. NAVARO, T. G. DAVIS. *Assistant Examiners.*